United States Patent
Kishimoto

(10) Patent No.: US 8,369,245 B2
(45) Date of Patent: Feb. 5, 2013

(54) COMMUNICATION APPARATUS HAVING NETWORK INTERFACES AND RESPONDING TO DEVICE SEARCH, COMMUNICATION METHOD, AND STORAGE MEDIUM

(75) Inventor: Norihisa Kishimoto, Kawasaki (JP)

(73) Assignee: Canon Kabushiki Kaisha (JP)

( * ) Notice: Subject to any disclaimer, the term of this patent is extended or adjusted under 35 U.S.C. 154(b) by 205 days.

(21) Appl. No.: 12/883,686

(22) Filed: Sep. 16, 2010

(65) Prior Publication Data

US 2011/0080852 A1   Apr. 7, 2011

(30) Foreign Application Priority Data

Oct. 5, 2009   (JP) ................................. 2009-231327

(51) Int. Cl.
  *H04L 12/28* (2006.01)
(52) U.S. Cl. .......................... 370/255; 370/351; 370/389
(58) Field of Classification Search .......... 370/254–258, 370/351–352, 389
  See application file for complete search history.

(56) References Cited

U.S. PATENT DOCUMENTS

| | | | | |
|---|---|---|---|---|
| 2003/0046409 | A1* | 3/2003 | Graham | 709/229 |
| 2004/0215822 | A1* | 10/2004 | Abe et al. | 709/242 |
| 2007/0258376 | A1* | 11/2007 | Li | 370/238 |
| 2008/0123606 | A1* | 5/2008 | Takizawa | 370/338 |
| 2009/0022161 | A1* | 1/2009 | Hirano | 370/400 |
| 2012/0087290 | A1* | 4/2012 | Rhee et al. | 370/311 |

FOREIGN PATENT DOCUMENTS

JP   2002-185496 A   6/2002

* cited by examiner

*Primary Examiner* — Ayaz Sheikh
*Assistant Examiner* — Mounir Moutaouakil
(74) *Attorney, Agent, or Firm* — Rossi, Kimms & McDowell LLP

(57) ABSTRACT

A communication apparatus that enables a device on a searching side to obtain a single search result, thereby reducing user confusion, even when the same search packet is received by network interfaces of the apparatus. The communication apparatus of a device on a searched side receives a search packet via one of a first and second NIC of the apparatus from a device on the searching side, and determines whether information that is same as information indicating the received search packet is stored. If the information is stored, one of the NICs to be used to respond to the search packet is selected, a response message is created, and the created response message is transmitted via the selected NIC to the device on the searching side. And if the information is not stored, the information indicating the search packet is stored.

8 Claims, 16 Drawing Sheets

FIG.4

| IP Frame | |
|---|---|
| TRANSMISSION SOURCE ADDRESS | 192.168.0.204 |
| TRANSMISSION DESTINATION ADDRESS | 239.255.255.253 |
| UDP Frame | |
| DESTINATION PORT NUMBER | 427 |
| SLP V2Frame | |
| function | ServiceRequest(1) |
| service type | "service:printer.xxx" |
| scope | "xxx" |

FIG.5A

| IP Frame | |
|---|---|
| TRANSMISSION SOURCE ADDRESS | 192.168.0.204 |
| TRANSMISSION DESTINATION ADDRESS | 239.255.255.250 |
| UDP Frame | |
| DESTINATION PORT NUMBER | 3702 |
| SOAP Frame | (501 IN FIG. 5B) |

```
<Envelope>
   <Header>
      <Action>Probe</Action>
      <MessageID>1</MessageID>
   </Header>
   <Body>
      <Probe>
         <Types>Printer</Types>
      </Probe>
   </Body>
</Envelope>
```

FIG.6A

| IP Frame | |
|---|---|
| TRANSMISSION SOURCE ADDRESS | 192.168.0.100 |
| TRANSMISSION DESTINATION ADDRESS | 192.168.0.204 |
| UDP Frame | |
| DESTINATION PORT NUMBER | 427 |
| SLP V2Frame | |
| function | ServiceRequest(1) |
| service type | "service:printer.xxx" |
| scope | "xxx" |

FIG.6B

| IP Frame | |
|---|---|
| TRANSMISSION SOURCE ADDRESS | 220.220.0.100 |
| TRANSMISSION DESTINATION ADDRESS | 192.168.0.204 |
| UDP Frame | |
| DESTINATION PORT NUMBER | 427 |
| SLP V2Frame | |
| function | ServiceRequest(1) |
| service type | "service:printer.xxx" |
| scope | "xxx" |

FIG.7A

| IP Frame | |
|---|---|
| TRANSMISSION SOURCE ADDRESS | 192.168.0.100 |
| TRANSMISSION DESTINATION ADDRESS | 192.168.0.204 |
| UDP Frame | |
| DESTINATION PORT NUMBER | 3702 |
| SOAP Frame | (701 IN FIG. 7B) |

```
<Envelope>
   <Header>
      <Action>ProbeMatch</Action>
      <MessageID>1</MessageID>
      <To>anonymous</To>
   </Header>
   <Body>
      <ProbeMatches>
         <ProbeMatch>
            <Types>Printer</Types>
            <XAddrs>http://192.168.0.100/wsd/mex</XAddrs>
            <MetadataVersion>1</MetadataVersion>
         </ProbeMatch>
      </ProbeMatches>
   </Body>
</Envelope>
```

FIG.8A

| IP Frame | |
|---|---|
| TRANSMISSION SOURCE ADDRESS | 220.220.0.100 |
| TRANSMISSION DESTINATION ADDRESS | 192.168.0.204 |
| UDP Frame | |
| DESTINATION PORT NUMBER | 3702 |
| SOAP Frame | (801 IN FIG. 8B) |

```
<Envelope>
   <Header>
      <Action>ProbeMatch</Action>
      <MessageID>1</MessageID>
      <To>anonymous</To>
   </Header>
   <Body>
      <ProbeMatches>
         <ProbeMatch>
            <Types>Printer</Types>
            <XAddrs>http://220.220.0.100/wsd/mex</XAddrs>
            <MetadataVersion>1</MetadataVersion>
         </ProbeMatch>
      </ProbeMatches>
   </Body>
</Envelope>
```

FIG.11

| RECEIVER NIC | SEARCH PROTOCOL | TRANSMISSION SOURCE ADDRESS | TRANSMISSION DESTINATION ADDRESS | SEARCH PROTOCOL DATA |
|---|---|---|---|---|
| NIC1 | SLP | 192.168.0.204 | 239.255.255.253 | service type: service: printer.xxx<br>scope: xxx |
| NIC2 | WSD | 192.168.0.204 | 239.255.255.250 | Types: Printer |
| NIC1 | WSD | 192.168.0.205 | 239.255.255.250 | Types: Printer |
| NIC2 | SLP | 192.168.0.206 | 239.255.255.253 | service type: service: printer.xxx<br>scope: xxx |
| NIC1 | WSD | 192.168.0.206 | 239.255.255.250 | Types: DataSend |

COMMUNICATION APPARATUS HAVING NETWORK INTERFACES AND RESPONDING TO DEVICE SEARCH, COMMUNICATION METHOD, AND STORAGE MEDIUM

BACKGROUND OF THE INVENTION

1. Field of the Invention

The present invention relates to a communication apparatus, a communication method, and a storage medium. More particularly, the present invention relates to a communication apparatus having network interfaces and responding to device search.

2. Description of the Related Art

A device (e.g., image forming apparatus) connected to a network can be utilized from another device (e.g., a personal computer (PC)) on the network in a manner, for example, that print data is transmitted for printing from the PC to the image forming apparatus via the network.

Under such a network environment, a user is able to search for and use a desired device from other device on the network, as needed. Techniques to locate the desired device on the network are known, such as WSD (web services on device), SLP (service location protocol), and SNMP (simple network management protocol). For device search by these techniques, a broadcast or multicast search packet is generally transmitted from a device on a searching side to devices on a searched side and a response packet is sent back from each device on the searched side in reply to the search packet.

In recent years, it becomes possible to perform the above-described device search via a rooter. It is also possible to connect a device having a plurality of network interface cards (NICs) to the network and use the device via the network. For example, two wired and/or wireless NICs are mounted to an image forming apparatus and connected to the same network or different networks, whereby flexible and diversified usage of the image forming apparatus can be achieved.

With such a construction, however, a device on the searched side sometimes simultaneously receives the same search packet at its plural NICs. In that case, the NICs of the device on the searched side each send back a response packet to the searching device. Therefore, multiple results are obtained by the searching device, even if there is only one device on the searched side, posing a problem that the user is confused in determining which response packet should be used. This is because the above-described device search techniques are each based on an assumption that there is no device having plural NICs.

Accordingly, a method has been proposed that stores beforehand, in a device, information representing a NIC from which a packet should be transmitted, as with a conventional rooter (see, for example, Japanese Laid-open Patent Publication No. 2002-185496).

However, with the proposed method, the same NIC is always selected from among the plural NICs of the device on the searched side, as a NIC to be used for response packet transmission. As a result, there is a possibility that the selected NIC does not conform to the purpose of device search. For example, in a case where an image forming apparatus (as a device on the searching side) searches for a data transmission destination device with the purpose of transmitting huge data (such as a set of setting values in the image forming apparatus), it is efficient to send back a response from a NIC (among the NICs of the device on the searched side) which is closer in position on the network to the device on the searching side. Nevertheless, if the information representing the NIC to be used for response transmission is merely stored beforehand in each device on the searched side, there is a possibility that the device on the searched side transmits a response packet from another NIC which is remoter in position on the network from the device on the searching side. It should be noted that the position on the network can be determined based on, e.g., subnet mask in the case of IPv4 and based on, e.g., address prefix in the case of IPv6.

SUMMARY OF THE INVENTION

The present invention provides a communication apparatus, a communication method, and a storage medium, which enable a device on a searching side to obtain a single search result to thereby reduce user confusion, even when the same search packet is received by a plurality of network interfaces of the communication apparatus.

According to a first aspect of this invention, there is provided a communication apparatus having a plurality of network interfaces, which comprises a reception unit configured to receive, via one of the plurality of network interfaces, a search packet for searching a device, a first determination unit configured to determine whether information that is same as information indicating the search packet received by the reception unit is stored in a storing unit, a selection unit configured to select, among the plurality of network interfaces, a network interface which is to be used to respond to the search packet received by the reception unit, a creation unit configured to create a response message to the search packet received by the reception unit, and a control unit configured to transmit the response message created by the creation unit via the network interface selected by the selection unit when it is determined by the first determination unit that the information is stored in the storing unit, and to store the information indicating the search packet received by the reception unit in the storing unit when it is determined by the first determination unit that the information is not stored in the storing unit.

According to a second aspect of this invention, there is provided a communication apparatus having a plurality of network interfaces, which comprises a reception unit configured to receive, via one of the plurality of network interfaces, a search packet for searching a device, a determination unit configured to determine whether information that is same as information indicating the search packet received by the reception unit is stored in a storing unit, a creation unit configured to create a response message to the search packet received by the reception unit, and a control unit configured to transmit the response message created by the creation unit via the network interface that is used to receive the search packet, and to store the information indicating the search packet received by the reception unit in the storing unit, when it is determined by the determination unit that the information is not stored in the storing unit.

According to third and fourth aspects of this invention, there are provided communication methods corresponding to respective ones of the communication apparatuses according to the first and second aspects of this invention.

According to fifth and sixth aspects of this invention, there are provided storage medium each storing a program for executing a corresponding one of the communication methods according to the third and fourth aspects of this invention.

With this invention, when receiving the same search packet at network interfaces, the communication apparatus selects one of the network interfaces and responds to the search packet. Thus, a device on the searching side is enabled to obtain a single search result, thereby reducing user confusion.

Further features of the present invention will become apparent from the following description of exemplary embodiments with reference to the attached drawings.

BRIEF DESCRIPTION OF THE DRAWINGS

FIG. 4 is a view showing an example search packet used for device search performed by a PC shown in FIG. 1 by using SLP;

FIGS. 5A and 5B are views showing an example search packet used for device search performed by the PC using WSD;

FIG. 6A is a view showing the content of a response packet sent back from a first NIC of the device in SLP protocol in reply to the search packet shown in FIG. 4;

FIG. 6B is a view showing the content of a response packet sent back from a second NIC of the device in SLP protocol in reply to the search packet shown in FIG. 4;

FIGS. 7A and 7B are views showing the content of a response packet sent back from the first NIC in WSD protocol in reply to the search packet shown in FIGS. 5A and 5B;

FIGS. 8A and 8B are views showing the content of a response packet sent back from the second NIC in WSD protocol in reply to the search packet shown in FIGS. 5A and 5B;

FIG. 11 is a view showing an example content of search packet information held in a packet information holding unit of the device;

DETAILED DESCRIPTION OF THE PREFERRED EMBODIMENTS

The present invention will now be described in detail below with reference to the drawings showing preferred embodiments thereof.

First Embodiment

Figure 1:
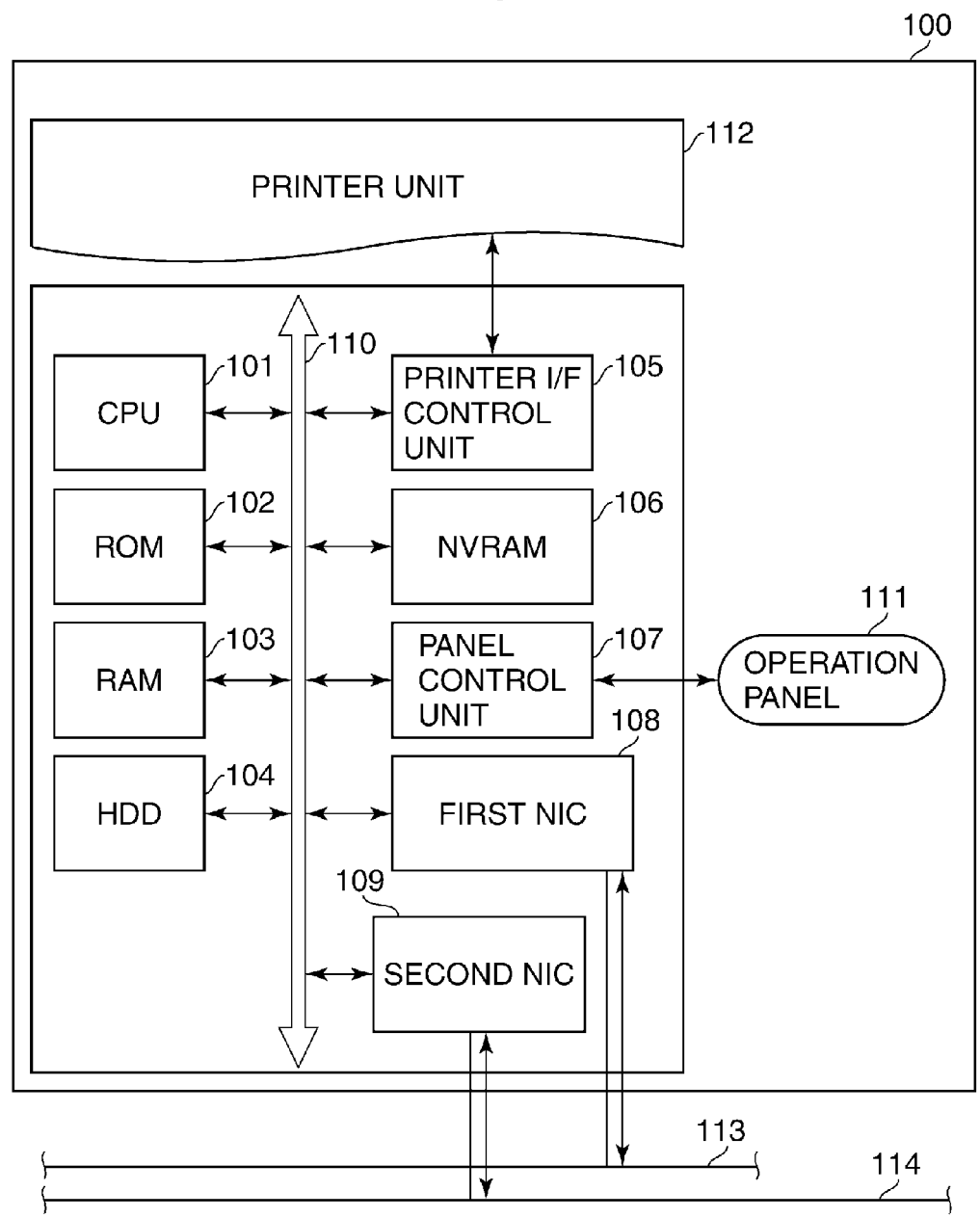
FIG. 1 is a block diagram showing the hardware construction of an image forming apparatus, which is a device including a communication apparatus according to a first embodiment of this invention.

FIG. 1 shows in block diagram the hardware construction of an image forming apparatus that includes a communication apparatus according to a first embodiment of this invention.

In FIG. 1, the image forming apparatus (hereinafter, referred to as the device) 100 is a printer having two network interfaces. The device 100 includes structural elements described below.

A CPU 101 executes a software program to control the entire device. A ROM 102 is a read-only memory that stores a boot program, fixed parameters, etc. A RAM 103 is a random-access memory for use by the CPU 101 to store temporary data, etc. during the device control.

A HDD 104 is a hard disk drive for storing various data such as print data. A printer I/F control unit 105 is for controlling a printer unit 112. A NVRAM 106 is a nonvolatile memory for storing various setting values for the device. A panel control unit 107 controls an operation panel 111, displays various information, and inputs user's instructions.

A first network I/F control unit 108 (hereinafter, referred to as the first NIC) is a network interface card (NIC), which is connected to a network 113 and controls data transmission to and data reception from the network 113. A second network I/F control unit (hereinafter, referred to as the second NIC) 109 is a NIC, which is connected to a network 114 and controls data transmission to and data reception from the network 114.

The networks 113, 114 may be the same network as each other or may be different networks from each other. Reference numeral 110 denotes a system bus to which the above-described structural elements are connected and through which a control signal and a data signal are transmitted and received mainly between the CPU 101 and the respective elements.

Figure 2:
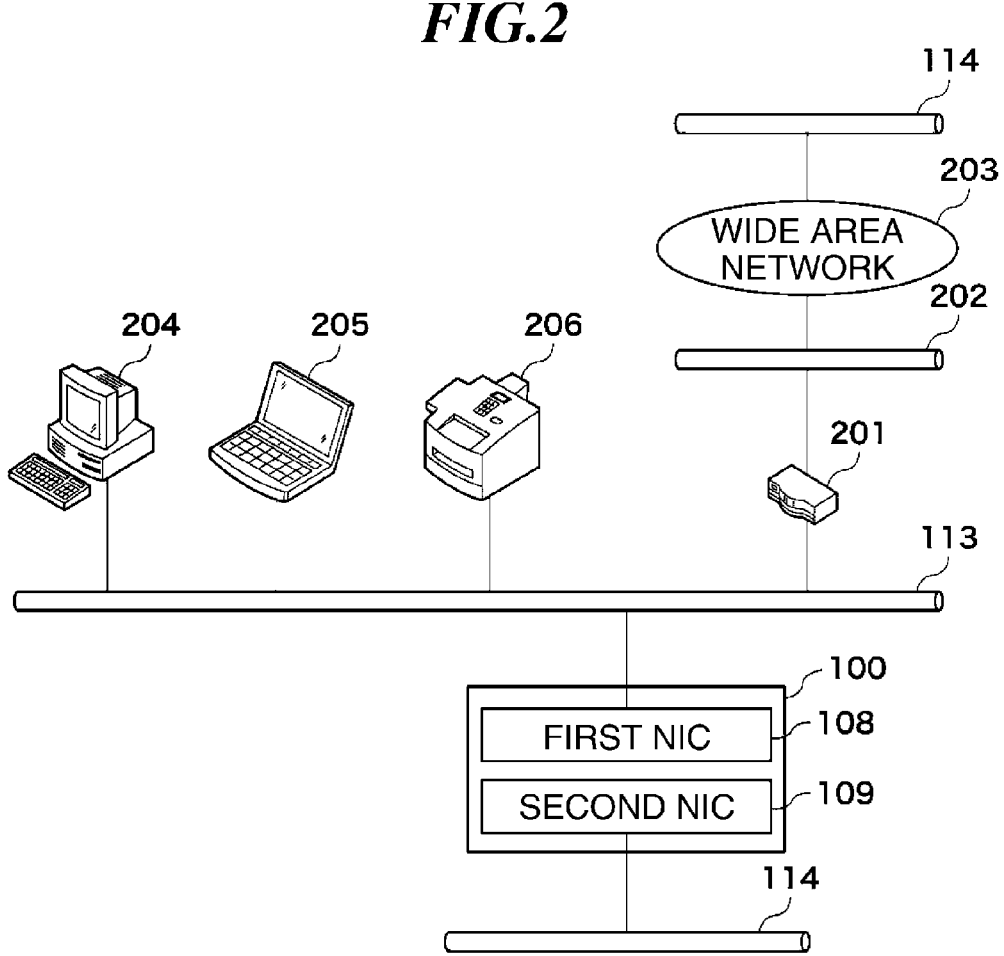
FIG. 2 is a view showing an example construction of a printing system including the device shown in FIG. 1.

FIG. 2 shows an example construction of a printing system including the device 100 shown in FIG. 1. In FIG. 2, the illustration of internal structure of the device 100 is simplified.

The first and second NICs 108, 109 of the device 100 are connected to respective ones of the networks 113, 114. It is assumed in this embodiment that the network 114 is a wider area network than the network 113 and the second NIC 109 has an address for more global use than that of the first NIC 108.

The network 113 has an address for more local use than that of the network 114 and is connected to the network 114 via a rooter 201 and networks 202, 203. The rooter 201, PCs 204, 205, and a device 206 are connected to the network 113.

The PC 204 is, e.g., a desktop-type personal computer, and the PC 205 is, e.g., a notebook-type personal computer. The device 206 is, e.g., an image forming apparatus of the same type as the device 100 shown in FIG. 1. It should be noted that in this embodiment the device 206 is provided with a single NIC, but may be provided with a plurality of NICs as with the device 100.

The rooter 201 has a function of transferring a multicast packet to different networks. In the illustrated network, the network 113 is a business office LAN and the network 114 is an intra-company LAN by which business offices are connected. It is assumed in this embodiment that a local network (e.g., network 113) has a subnet mask of 192.168.0.0 and a wide area network (e.g., network 114) has a subnet mask of 220.220.0.0.

Next, a description will be given of a search process to locate the device 100 from the PCs 204, 205 and the device 206.

In this embodiment, the PCs 204, 205 and the device 206 are devices on the searching side that utilize the device 100 via the network, and the device 100 is a device on the searched side. In the following, a description will be given only of a case where the search process is performed by the PC 204 to locate the device 100 since the same search process is performed by the PCs 204, 205 and the device 206. In the following example, SLP and WSD are used as protocols for the search process, but other protocols can be used.

Figure 3:
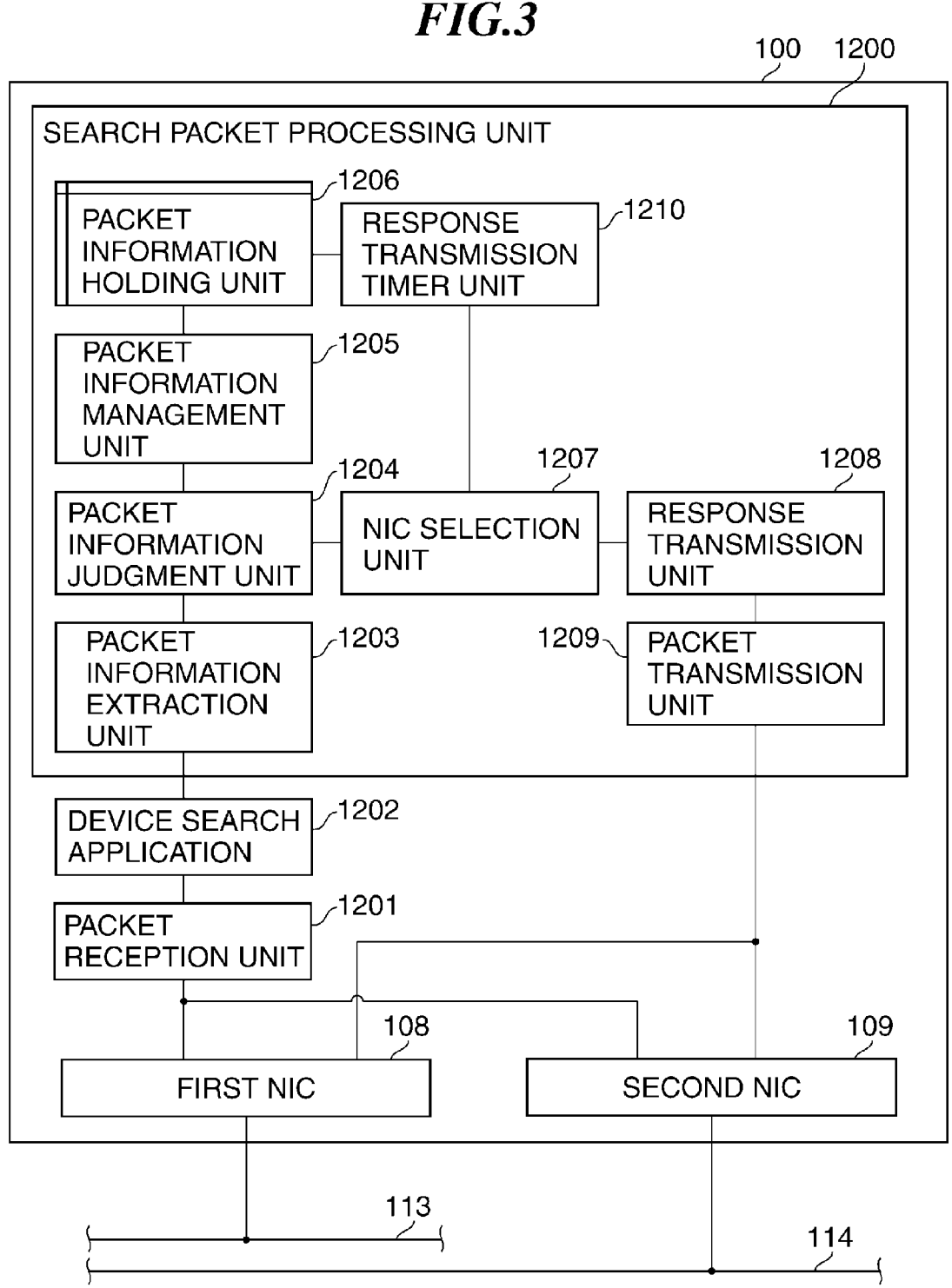
FIG. 3 is a block diagram showing a search process-related software construction of the device.

FIG. 3 shows in block diagram a search process-related software construction of the device 100. It should be noted that the illustrated example includes a part (the first and second NICs 108, 109) of the hardware construction of the device 100.

As shown in FIG. 3, the device 100 includes a search packet processing unit 1200, a packet reception unit 1201, and a device search application 1202.

The packet reception unit 1201 receives data (e.g., search packet) received by and transmitted from the first NIC 108 or the second NIC 109, performs a low-level protocol process on the received data, and delivers the processed data to the device search application 1202. The term "low-level protocol process" represents a low-level process in the OSI reference model as typified by TCP/IP. The low-level process is usually executed by a protocol stack contained in the OS, and an IP header, TCP header, UDP header, etc. are processed in that stage.

Heretofore, the device search application immediately sends back a response in reply to a search packet upon receipt thereof. This embodiment differs from the prior art in that the search packet processing unit 1200 performs a process after reception of a search packet.

When receiving the search packet, the device search application 1202 entrusts search packet analysis to the search packet processing unit 1200. The processing unit 1200 analyzes protocol data contained in the search packet received by the first or second NIC 108 or 109, and temporarily stores the analyzed data. When detecting that another NIC receives the same search packet, the search packet processing unit 1200 selects an appropriate one of the NICs from which a response is to be sent, and performs a response transmission process. In this embodiment, a packet information extraction unit 1203 extracts, from the search packet, information representing characteristics of the search packet (hereinafter referred to as the search packet information or the packet information), and a packet information holding unit 1206 holds the extracted search packet information. In the holding unit 1206, a search packet reception history, as the search packet information, is stored and managed for a given time period in a table form shown in FIG. 11.

In this embodiment, pieces of information on a receiver NIC, search protocol, transmission source address, transmission destination address, and search protocol data are stored as the search packet information in the packet information holding unit 1206, as shown in FIG. 11, but the search packet information is not limited thereto. For the holding unit 1206, a nonvolatile storage region or a volatile storage region can be used.

A packet information management unit 1205 manages the packet information holding unit 1206, acquires information held in the holding unit 1206 in accordance with a request, and stores the search packet information extracted by the packet information extraction unit 1203 into the holding unit 1206.

A packet information judgment unit 1204 inquires the packet information management unit 1205 about whether the same packet information as packet information extracted from a currently received search packet is already stored in the packet information holding unit 1206, thereby searching for the stored packet information which is the same as the currently extracted packet information. When determining that the same packet information as the currently extracted packet information is not stored in the holding unit 1206, the judgment unit 1204 determines that the currently received search packet is a search packet received for the first time, and requests the management unit 1205 to store the packet information extracted from the currently received search packet in the holding unit 1206. On the other hand, when determining that the same packet information as the currently extracted packet information is already stored in the holding unit 1206, the judgment unit 1204 determines that the same search packet as the search packet previously received by another NIC is currently received again. In that case, a response transmission process is performed as described below.

Specifically, a NIC selection unit 1207 determines which of the NICs is appropriate as a response transmission source NIC, and notifies a response transmission unit 1208 of a combination of the packet information extracted from the received search packet and information representing the response transmission source NIC. The response transmission unit 1208 creates a response message according to specification of search protocol. At that time, data is created by using an IP address of the selected NIC. In the case of, e.g., WSD response packet, a value in a "XAddrs" field of the response packet varies depending on the selected NIC (see, FIGS. 7B and 8B).

Finally, the created response packet is transmitted by a packet transmission unit 1209 via the selected NIC. As with the packet reception unit 1201, the packet transmission unit 1209 performs a low-level protocol process, whereby a TCP header, UDP header, IP header, etc. are added and the response packet is transmitted to the network.

A response transmission timer unit 1210 periodically accesses the packet information holding unit 1206, and notifies the NIC selection unit 1207 of one or more pieces of packet information for each of which a predetermined time has lapsed from when the packet information was held in the holding unit 1206. In response to the notification, a process similar to the above-described response transmission process is performed.

It should be noted that the search packet processing unit 1200 may be provided separately from the device search application 1202 as in the illustrated example, but may be provided in the device search application 1202.

Next, a description will be given of a search packet used for device search performed by the PC 204 by using SLP.

FIG. 4 shows an example search packet used for device search performed by the PC 204 by using SLP.

The search packet shown in FIG. 4 includes an IP frame consisting of a transmission source address field and a transmission destination address field. In the transmission source address field, e.g., an address that can be used for communication via the network 113 is stored as a transmission source address. In the illustrated example, the transmission source address is 192.169.0.204, which is an IP address of the PC 204. In the transmission destination address field, a multicast address that can be received by all the PCs and devices belonging to a multicast group is stored as a transmission destination address. In the illustrated example, the transmission destination address is 239.255.255.253, which is a multicast address for SLP search. A UDP frame of the search packet consists of a destination port number field in which a destination port number determined according to protocol is stored. In the illustrated example, the destination port number is 427 so that the SLP uses port 427 of the UDP.

The search packet includes a SLP V2 Frame which consists of a function field, a service type field, and a scope field and in which SLP protocol data is stored. A device that receives the search packet is able to determine a search object based on the protocol data. In the illustrated example, a value "ServiceRequest(1)" in the function field represents that the search object is a service, a value "service:printer.xxx" in the service type field represents that the search object is a printer, and a value "xxx" in the scope field represents a range of the search object. The value "xxx" can arbitrarily be set by a user.

The search packet in the illustrated example represents device search intended to locate a printer belonging to the scope of "xxx". By changing the values in the service type field and the scope field, a device other than a printer can be located by search.

FIGS. 5A and 5B show an example search packet used for device search performed by the PC 204 by using WSD. FIG. 5A shows the content in TCP/IP level and FIG. 5B shows protocol data in WSD search protocol.

The search packet shown in FIG. 5A includes an IP frame having a transmission source address field in which the same transmission source address "192.168.0.204" as that shown in FIG. 4 is stored. In a transmission destination address field, a WSD multicast address "239.255.255.250" is stored. A UDP frame includes a destination port number field in which a destination port number "3702" is stored, so that the WSD transmits the multicast packet to port 3702 of the UDP.

The protocol data shown in FIG. 5B indicates that a search is performed by WSD search protocol by exchanging XML (extensible markup language) data by using SOAP (simple object access protocol). Specifically, a letter string "Probe" in an <Action>field represents that the protocol data is used for device search. A value ("1" in the illustrated example) in a <MessageID> field is an identifier for identifying the protocol data and unique to the search packet. A value "Printer" in a <Types> field indicates that the search object is a printer. A device other than a printer can be searched by changing the value in the <Types> field.

In the following, with reference to FIG. 2, a description will be given of the flow of the SLP or WSD search packet from the PC 204 to the first and second NICs 108, 109 of the device 100.

A search packet transmitted from the PC 204 reaches the first NIC 108 of the device 100 that belongs to the network 113, and also reaches the second NIC 109 of the device 100 that belongs to the network 114 via the rooter 201 able to transfer a multicast packet and via the networks 202, 203. Thus, the device 100 receives the same search packet at both the NICs 108, 109. In the illustrated example, the first and second NICs 108, 109 are connected to different subnets, but may be connected to the same subnet.

Next, a response packet sent back from the device 100 in reply to a received search packet will be described.

FIG. 6A shows the content of a packet sent from the device 100 via the first NIC 108 in SLP protocol in reply to the search packet shown in FIG. 4, and FIG. 6B shows the content of a packet sent from the device 100 via the second NIC 109 in SLP protocol in reply to the search packet shown in FIG. 4.

A transmission source address stored in an IP frame of the response packet shown in FIG. 6A is the address "192.168.0.100" of the first NIC 108 of the device 100, and a transmission destination address is the address "192.168.0.100" of the PC 204. The same values as those of the search packet shown in FIG. 4 are stored in a function field, service type field, and scope field of a SLP V2Frame of the response packet. It is therefore indicated that the response packet is a reply to the search packet shown in FIG. 4. The response packet shown in FIG. 6B differs from the response packet shown in FIG. 6A in that the transmission source address is the address "220.220.0.100" of the second NIC 109 of the device 100.

The response packet shown in FIG. 6A and transmitted from the first NIC 108 of the device 100 reaches the PC 204 via the network 113. On the other hand, the response packet shown in FIG. 6B and transmitted from the second NIC 109 of the device 100 reaches the PC 204 via the networks 114, 203, and 202, the rooter 201, and the network 113.

With a prior art device, in a case where a search packet for device search is received by plural NICs, response packets are sent back from these NICs. For example, in the case of SLP, a response packet as shown in FIG. 6A is sent back from one of the NICs and a response packet as shown in FIG. 6B is sent back from another NIC.

FIGS. 7A and 7B show the content of a response packet sent back from the first NIC 108 in WSD protocol in reply to the search packet shown in FIGS. 5A and 5B. FIGS. 8A and 8B show the content of a response packet sent back from the second NIC 108 in WSD protocol in reply to the search packet shown in FIGS. 5A and 5B.

In WSD, a response packet shown in FIGS. 7A and 7B is sent back from the first NIC 108 of the device 100, and a response packet shown in FIGS. 8A and 8B is sent back from the second NIC 109 of the device 100.

A transmission source address stored in an IP frame of the response packet shown in FIG. 7A is the address "192.168.0.100" of the first NIC 108 of the device 100, which indicates that the response packet is transmitted from the first NIC 108. A transmission source address stored in an IP frame of the response packet shown in FIG. 8A is the address "220.220.0.100" of the second NIC 109 of the device 100, which indicates that the response packet is transmitted from the second NIC 109. FIGS. 7B and 8B each show protocol data of the response packet in WSD search protocol.

In FIG. 7B, a value "ProbeMatch" in an <Action> field indicates that the response packet is a reply to the search packet containing the letter string "Probe" and shown in FIGS. 5A and 5B. A value ("1" in the illustrated example) in a <MessageID> field is for identifying a message transmitted from the device 100 in WSD search protocol. A value ("anonymous" in the illustrated example) in a <To> field represents a destination in WSD search protocol. A letter string "Printer" in a <Types> field in the illustrated example indicates that the device 100 is a printer. A value in an <XAddrs> field represents an address to be used in a communication after the device search. In the illustrated example, a value "http://192.168.0.100/wsd/mex" represents that access to the first NIC 108 should be made using HTTP (hypertext transfer protocol). A value ("1" in the illustrated example) in a <MetadataVersion> field represents aversion of device attribute change.

Next, a description will be given of operation processes performed by the device 100 to receive a search packet and transmit a response packet.

For device search, the PC 204 transmits a search packet shown in FIG. 4 or FIGS. 5A and 5B to the network 113 using a search protocol. The transmitted search packet reaches the first NIC 108 of the device 100 via the network 113, and also reaches the second NIC 109 of the device 100 via the network 113, rooter 201, and networks 202, 203, 114. When receiving the same search packet at the first and second NICs 108, 109, the device 100 decides which of the NICs is to be used for response packet transmission, and transmits a response packet from the decided NIC.

It is assumed in this embodiment that in the case of SLP, a communication subsequent to a search packet reception is temporary (i.e., the PC 204 only transmits certain data to the device 100 after the device 100 is located by search), whereas in the case of WSD, a communication subsequent to a search packet reception is continuous (i.e., the PC 204 installs and uses a driver to setup the device 100 as a normally used printer after the device 100 is located by search). In this embodiment, therefore, the purpose of communication subsequent to packet reception (the purpose of device search) is determined according to a search protocol with which a search packet is received.

The purpose of communication after packet reception can also be determined based on a value contained in search protocol data. For example, in a case where a value of the <Types> field in the data shown in FIG. 5B for WSD search protocol is not "Printer" but "DataSend", it is possible to determine that the purpose of communication is to perform data transmission. In that case, when the device 100 receives a search packet shown in FIG. 4, since a communication subsequent to SLP search is temporary, it is efficient in the communication to use the first NIC 108 belonging to a nearer network. To this end, a response packet shown in FIG. 6A is transmitted from the first NIC 108 in reply to the search packet.

When the device 100 receives a search packet shown in FIGS. 5A and 5B, since the purpose of a communication subsequent to WSD search is to perform printing, it is preferable that the more global second NIC 109 be used for the communication so as to be ready for a change in network configuration or the like. Also in the case of a PC or the like, it is preferable to use the second NIC 109 in the communication to enable the PC or the like to be usable even after a change of network connection location. To this end, a response packet shown in FIGS. 8A and 8B is transmitted from the second NIC 109 in reply to the search packet.

Next, with reference to FIG. 9, a description will be given of a process performed by the search packet processing unit 1200 to transmit a response packet in reply to a search packet.

Figure 9:
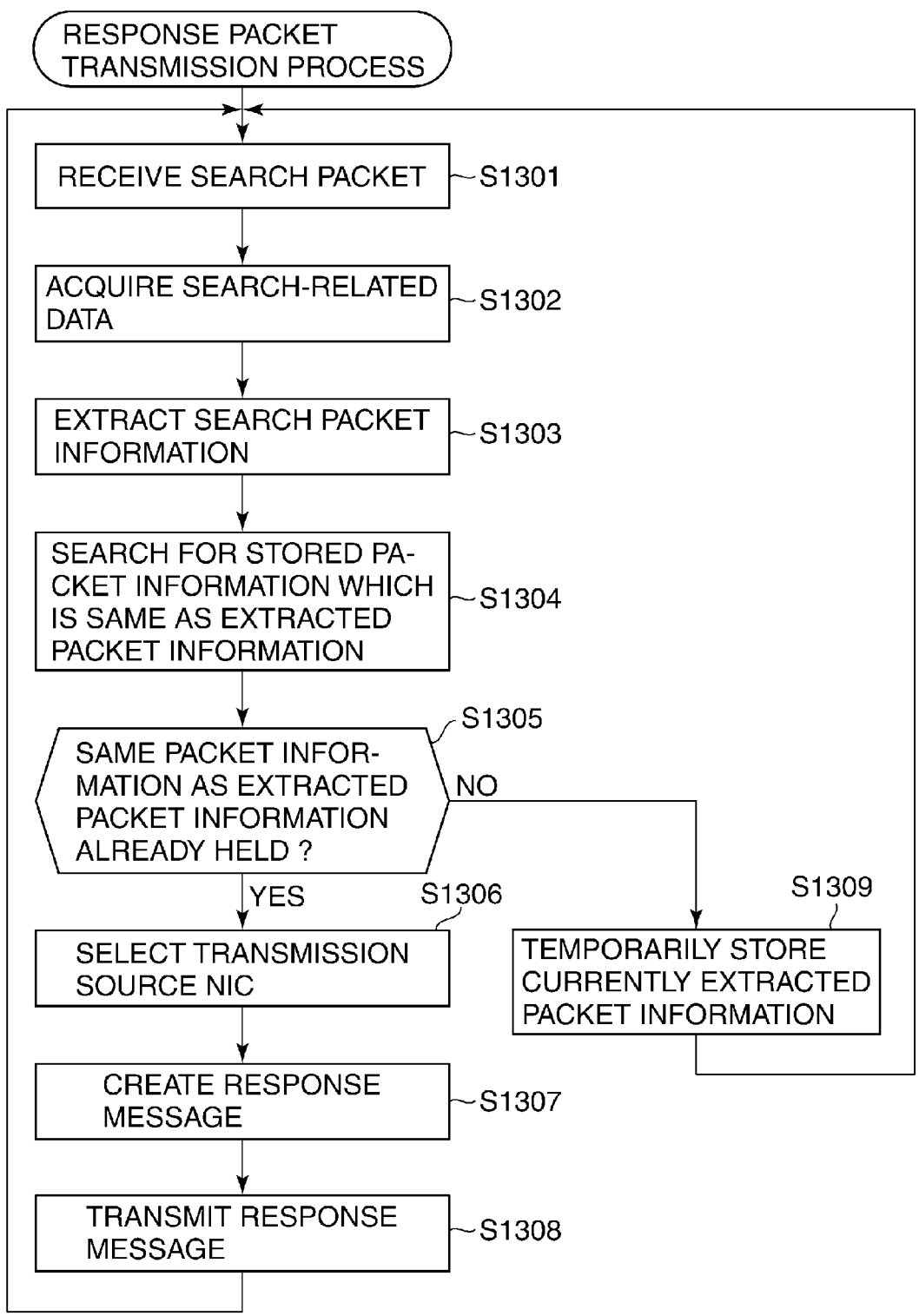
FIG. 9 is a flowchart showing the flow of a process performed by a search packet processing unit of the device to transmit a response packet in reply to a search packet.

FIG. 9 shows in flowchart the flow of the process performed by the search packet processing unit 1200 to transmit a response packet in reply to a search packet.

In step S1301, the packet reception unit 1201 receives a search packet from the first NIC 108 or from the second NIC 109, and performs low-level protocol processing on an IP header, TCP header, UDP header, etc. In step S1302, the device search application 1202 performs processing on the search packet according to search protocol and acquires search-related data.

In step S1303, the packet information extraction unit 1203 analyzes data contained in the search packet, and extracts information representing characteristics of the search packet (hereinafter, referred to as the search packet information or the packet information) from the search packet. As the search packet information, there can be mentioned, for example, pieces of information on a receiver NIC, transmission source address, and transmission destination address, which are shown in FIG. 11.

Next, in step S1304, the packet information judgment unit 1204 inquires the packet information management unit 1205 about whether the same packet information as packet information extracted in step S1303 is already stored in the packet information holding unit 1206, thereby searching for the stored packet information which is the same as the currently extracted packet information. In step S1305, based on a result of the inquiry (search), the judgment unit 1204 determines whether the same packet information as the packet information extracted in step S1303 is already held in the holding unit 1206. Step S1305 is an example of a first determination unit. If it is determined in step S1305 that there is no packet information coincident with the extracted packet information, the packet information management unit 1205 temporarily stores the information extracted in step S1303 in the holding unit 1206 (step S1309). Then, the flow returns to step S1301.

If it is determined in step S1305 that there is packet information in the holding unit 1206, which is coincident with the packet information extracted in step S1303, the NIC selection unit 1207 selects a transmission source NIC to be used for response (step S1306). Step S1306 is an example of a selection unit. The details of processing in step S1306 will be described later.

Next, in step S1307, the response transmission unit 1208 creates a response message (response packet) according to search protocol. In step S1308, the packet transmission unit 1209 transmits the created response message, whereupon the flow returns to step S1301.

Next, with reference to FIG. 10, a response packet transmission process periodically performed by the response transmission timer unit 1210 of the search packet processing unit 1200 will be described in detail.

Figure 10:
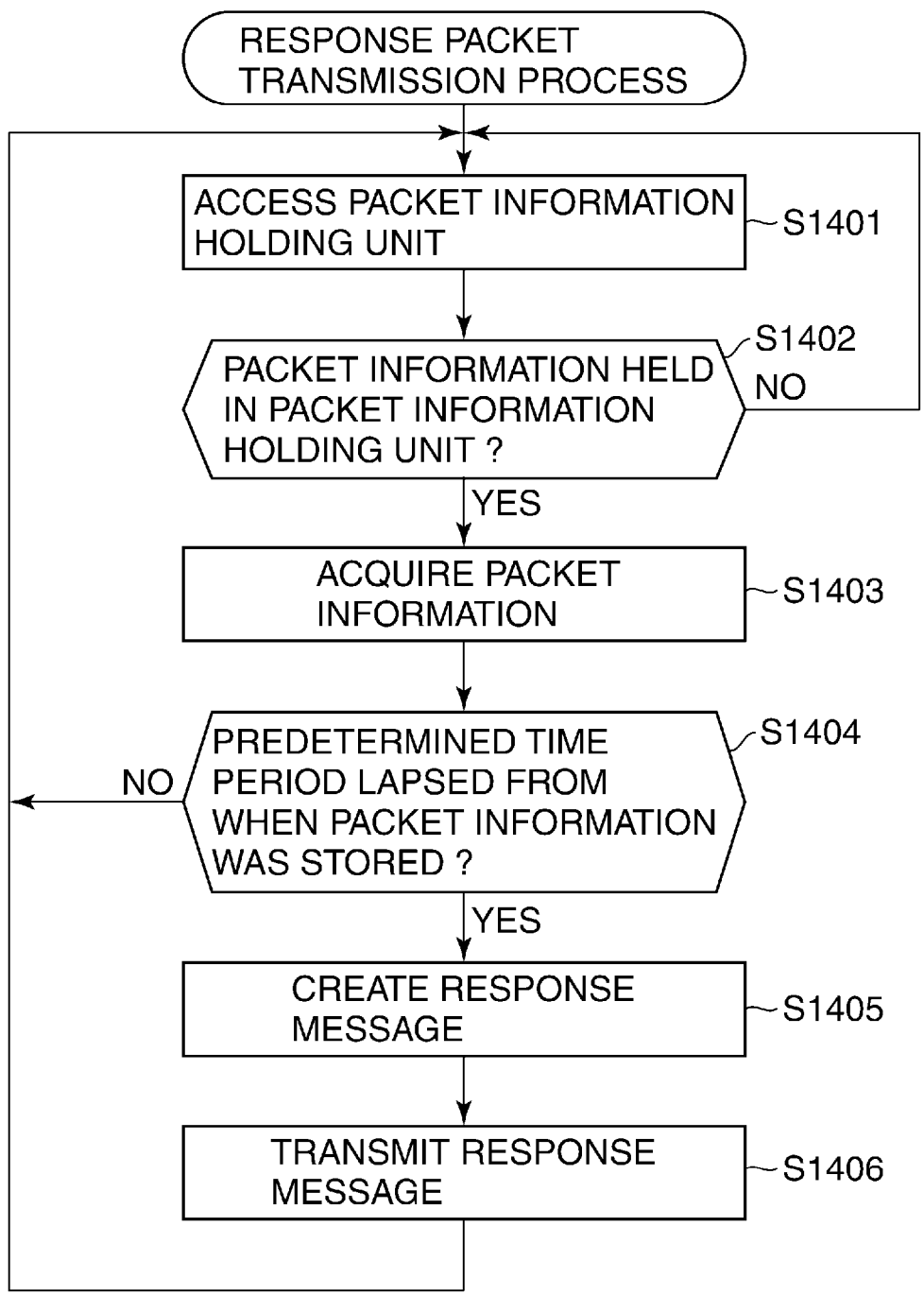
FIG. 10 is a flowchart showing the flow of a response packet transmission process performed by a response transmission timer unit of the device.

FIG. 10 show in flowchart the flow of the response packet transmission process performed by the response transmission timer unit 1210.

In step S1401, the response transmission timer unit 1210 accesses the packet information holding unit 1206. In step S1402, the timer unit 1210 determines whether packet information is stored in the holding unit 1206. If no packet information is stored in the holding unit 1206, the flow returns to step S1401. If packet information is stored in the holding unit 1206, one piece of packet information is acquired from the holding unit 1206 (step S1403).

In step S1404, the timer unit 1210 determines whether a predetermined time period has lapsed from when the packet information acquired in step S1403 was stored in the holding unit 1206. Step S1404 is an example of a second determination unit. If the answer to step S1404 is NO, the flow returns to step S1401. If the answer to step S1404 is YES, the flow proceeds to step S1405.

In step S1405, the response transmission unit 1208 creates a response message. In step S1406, with reference to the search packet information shown in FIG. 11, the created response message is transmitted from the packet transmission unit 1209 via the NIC that has received the search packet, whereupon the flow returns to step S1401.

Next, with reference to FIG. 12, a description will be given of the details of a NIC selection process in which a response transmission source NIC is selected based on search packet information shown in FIG. 11 and stored in the packet information holding unit 1206. This process is performed by the NIC selection unit 1207 in step S1306 in FIG. 9.

Figure 12:
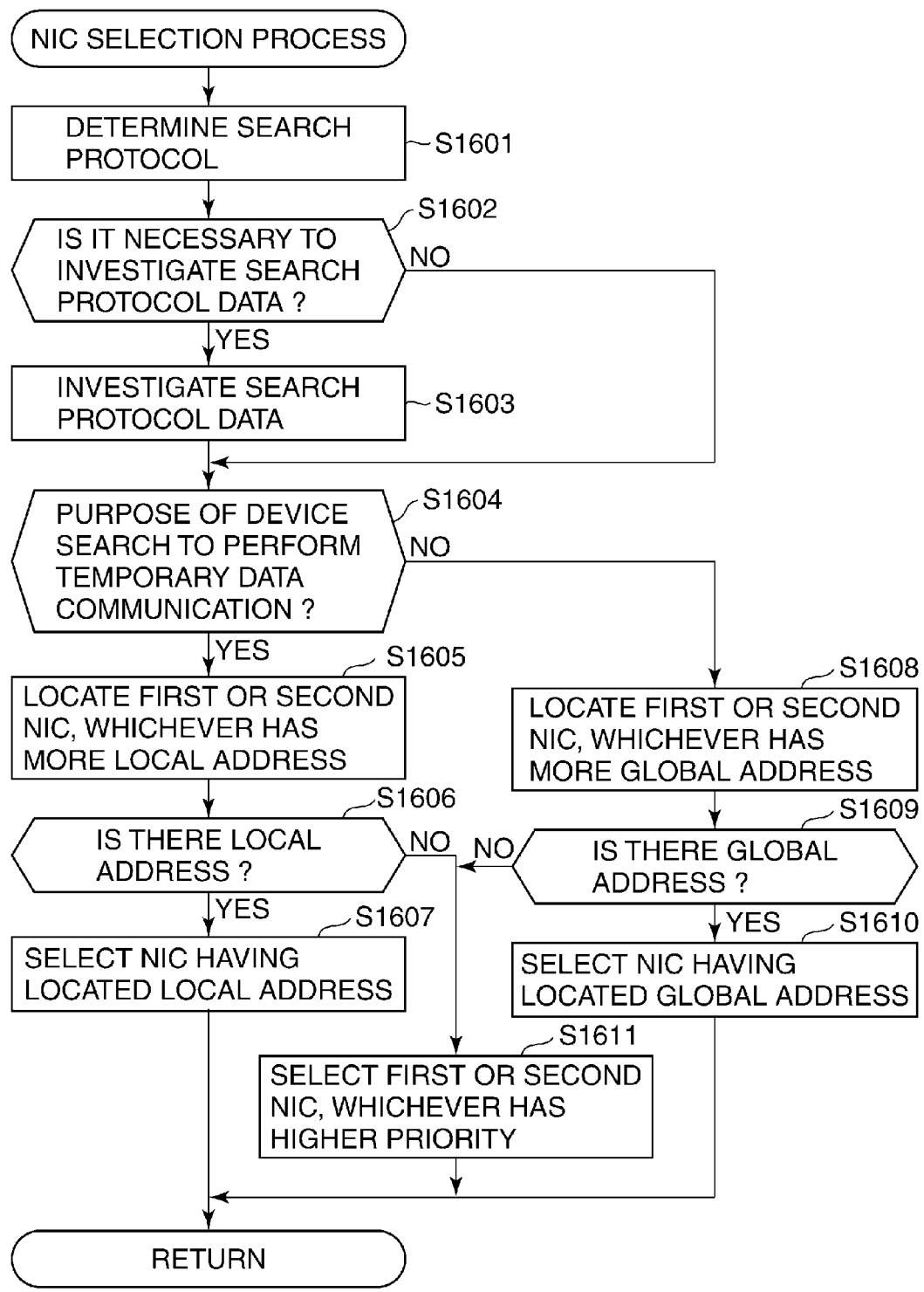
FIG. 12 is a flowchart showing the flow of a NIC selection process performed by a NIC selection unit of the device.

FIG. 12 shows in flowchart the flow of the NIC selection process performed by the NIC selection unit 1207.

In step S1601, the NIC selection unit 1207 determines a search protocol based on the search packet information, which is shown in FIG. 11 and held in the packet information holding unit 1206. In step S1602, the NIC selection unit 1207 determines whether it is necessary to investigate the content of search protocol data. The investigation is for determining the purpose of device search (the purpose of a communication after device search) according to the search protocol. Depending on a mounted device, if the search protocol is SLP, it is determined that data transmission/reception after device search is temporary. In such a case, the flow proceeds to step S1604, without investigating the content of search protocol data. On the other hand, if the purpose of communication after device search cannot be determined based on only the search protocol, the NIC selection unit 1207 investigates the content of search protocol data (step S1603).

In step S1604, based on a result of the investigation in step S1603, the NIC selection unit 1207 determines whether the purpose of device search is to perform temporary data communication. Step S1604 is an example of a third determination unit. If it is determined in step S1604 that the purpose of device search is to perform temporary data communication, the NIC selection unit 1207 locates either the address of the first NIC 108 or the address of the second NIC 109, whichever is more local, i.e., whichever is nearer to an address of a search packet transmission source (step S1605). On the other hand, if it is determined that as in printer driver installation, the purpose of device search is not to perform temporary data communication, the judgment unit 1207 locates either the address of the first NIC 108 or the address of the second NIC 109, whichever is usable in a wider area (step S1608).

If it is determined in step S1605 that there is the address (local address) nearer to the transmission source address (YES to step S1606), the NIC selection unit 1207 selects the NIC assigned with the located address (step S1607). If there is no address nearer to the transmission source address (NO to step S1606), the NIC selection unit 1207 selects either the first NIC 108 or the second NIC 109, whichever has a higher priority (step S1611).

If it is determined in step S1608 that there is the address usable in a wider area (global address) (YES to step S1609), the NIC selection unit 1207 selects the NIC assigned with the located address (step S1610). If there is no address usable in a wider area (NO to step S1609), the NIC selection unit 1207 selects either the first NIC 108 or the second NIC 109, whichever has a higher priority (step S1611).

According to the first embodiment, in a case where a device capable of responding to a search packet receives the same search packet at its plural NICs, the device selects one of the NICs and responds to the search packet. Accordingly, a device on the searching side is able to obtain a single search result, thereby reducing user confusion. Since one of the NICs is selected by taking into account of the purpose of device search, it is possible to send a response more appropriate for the searching device in reply to the search packet.

Second Embodiment

A device 200 according to a second embodiment of this invention is basically the same in construction and network environment as the device 100 (FIGS. 1 and 2) of the first embodiment. Elements, which are the same as or similar to those of the first embodiment, are denoted by the same reference numerals and a description thereof is omitted.

The device 200 sends a response packet only in reply to a first-arrived search packet among packets received by the first and second NICs 108, 109. Specifically, in a case that a search packet is received for the first time by the first NIC 108, a response packet is sent from the first NIC 108. Even if the same search packet is subsequently received by the second NIC 109, no response packet is transmitted from the second NIC 109 so that the subsequently received search packet is disregarded.

Figure 13:
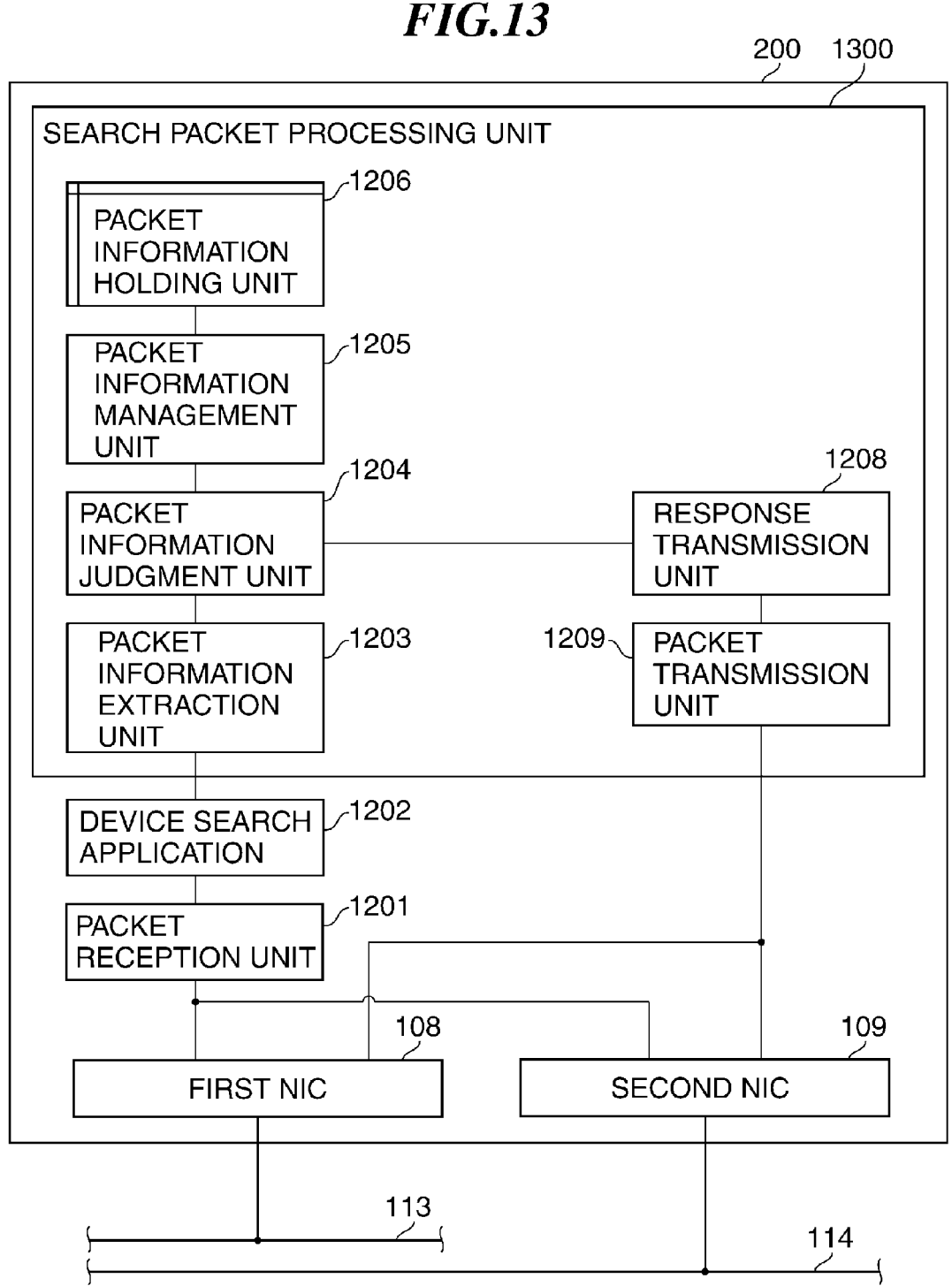
FIG. 13 is a block diagram showing a search process-related software construction of a device according to a second embodiment of this invention.

FIG. 13 shows in block diagram a search process-related software construction of the device 200.

The device 200 differs from the device 100 shown in FIG. 3 in that it does not include the NIC selection unit 1207 and the response transmission timer unit 1210, but is the same as the device 100 in that a received search packet is processed by a search packet processing unit 1300 corresponding to the search packet processing unit 1200 in FIG. 3.

In this embodiment, when a search packet is received at one of the NICs (e.g., the first NIC 108), the packet reception unit 1201, packet reception unit 1201, and packet information extraction unit 1203 of the device 200 perform processing which is the same in content as the processing previously described with reference to FIG. 3. Then, the packet information judgment unit 1204 determines whether the same packet information as packet information extracted from the received search packet is already held in the packet information holding unit 1206. If the same packet information as the currently extracted packet information is not held in the holding unit 1206, it is determined that the currently received search packet is a search packet which is received for the first time, and a response is sent from the response transmission unit 1208 in the same manner as that previously described with reference to FIG. 3.

Figure 14:
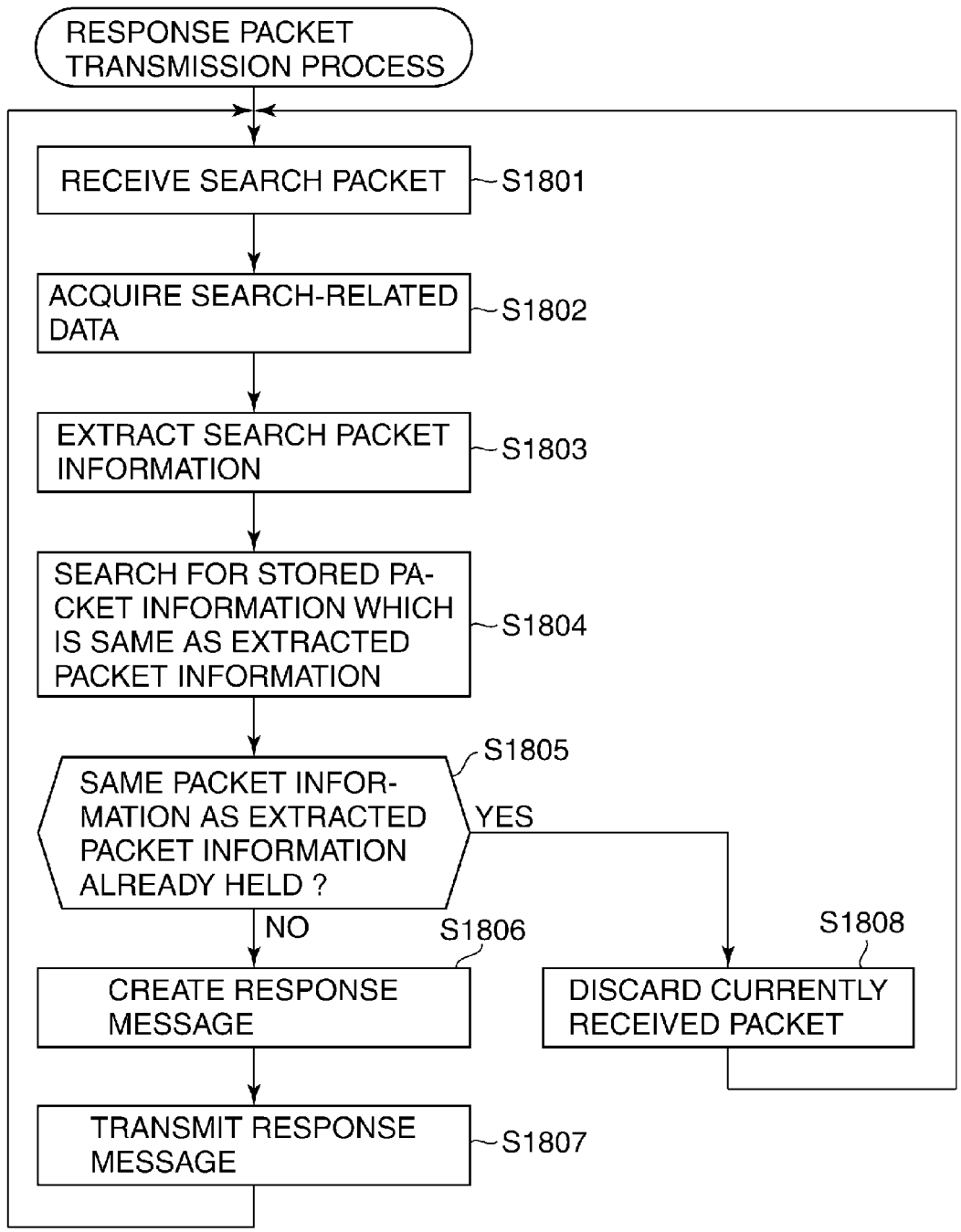
FIG. 14 is a flowchart showing the flow of a process, according to the second embodiment, for transmitting a response packet in reply to a search packet.

FIG. 14 shows in flowchart the flow of a process, according to the second embodiment, for transmitting a response packet in reply to a search packet.

In step S1801, the packet reception unit 1201 receives a search packet from the first NIC 108 or the second NIC 109, and performs low-level protocol processing on an IP header, TCP header, UDP header, etc. In step S1802, the device search application 1202 performs processing on the search packet according to search protocol and acquires search-related data.

In step S1803, the packet information extraction unit 1203 analyzes data contained in the search packet, and extracts information representing characteristics of the search packet (hereinafter, referred to as the search packet information or the packet information) from the search packet. An example of the search packet information is shown in FIG. 11.

In step S1804, the packet information management unit 1205 searches for packet information, which is held in the packet information holding unit 1206 and the same as the packet information extracted in step S1803. In step S1805, the packet information judgment unit 1204 determines whether the same packet information as the packet information extracted in step S1803 is already held in the holding unit 1206. If the answer to step S1805 is YES, the packet information judgment unit 1204 discards the currently received packet, i.e., the currently extracted search packet information (step S1808), whereupon the flow returns to step S1801.

On the other hand, if the answer to step S1805 is NO, the response transmission unit 1208 creates a response message (response packet) according to search protocol (step S1806). In step S1807, the created response message is transmitted by the packet transmission unit 1209 from the NIC that has received the search packet for the first time, whereupon the flow returns to step S1801.

When a search packet is received by, e.g., the first NIC 108 for the first time, there is no packet information coincident with packet information extracted from the search packet received by the first NIC 108, and therefore, a response message is sent back by the packet transmission unit 1209 from the first NIC 108. When the same search packet as that received by the first NIC 108 is subsequently received by the second NIC 109, there is packet information coincident with packet information extracted from the search packet received by the second NIC 109, and therefore, the received search packet is discarded and no response message is sent back from the second NIC 109.

According to the second embodiment, when a search packet is received by, e.g., the first NIC 108 for the first time, a response packet is sent back from the NIC 108. Subsequently, when the same search packet is received by the second NIC 109, the subsequently received search packet is discarded and no response packet is transmitted from the second NIC 109. Accordingly, in a case where a device capable of responding to a search packet receives the same search packet at its plural NICs, the device selects one of the NICs and responds to the search packet. Thus, a device on the searching side is able to obtain a single search result, thereby reducing user confusion.

Third Embodiment

A device 300 according to a third embodiment of this invention is basically the same in construction and network environment as the device 100 (FIGS. 1 and 2) according to the first embodiment. Elements same as or similar to those of the first embodiment are denoted by the same reference numerals and a description thereof is omitted.

When receiving a search packet, the device 300 compares information representing a receiver NIC that has received the search packet with the content of the search packet, and immediately sends a response packet, if it is determined that the receiver NCI is appropriate for sending a reply. On the other hand, if it is determined that the receiver NCI is not appropriate for sending a reply, search packet information is temporarily held. Subsequently, when the same search packet is received by another NIC, a response packet is sent back if the same packet information as the information extracted from the search packet is already held in the packet information holding unit 1206.

Figure 15:
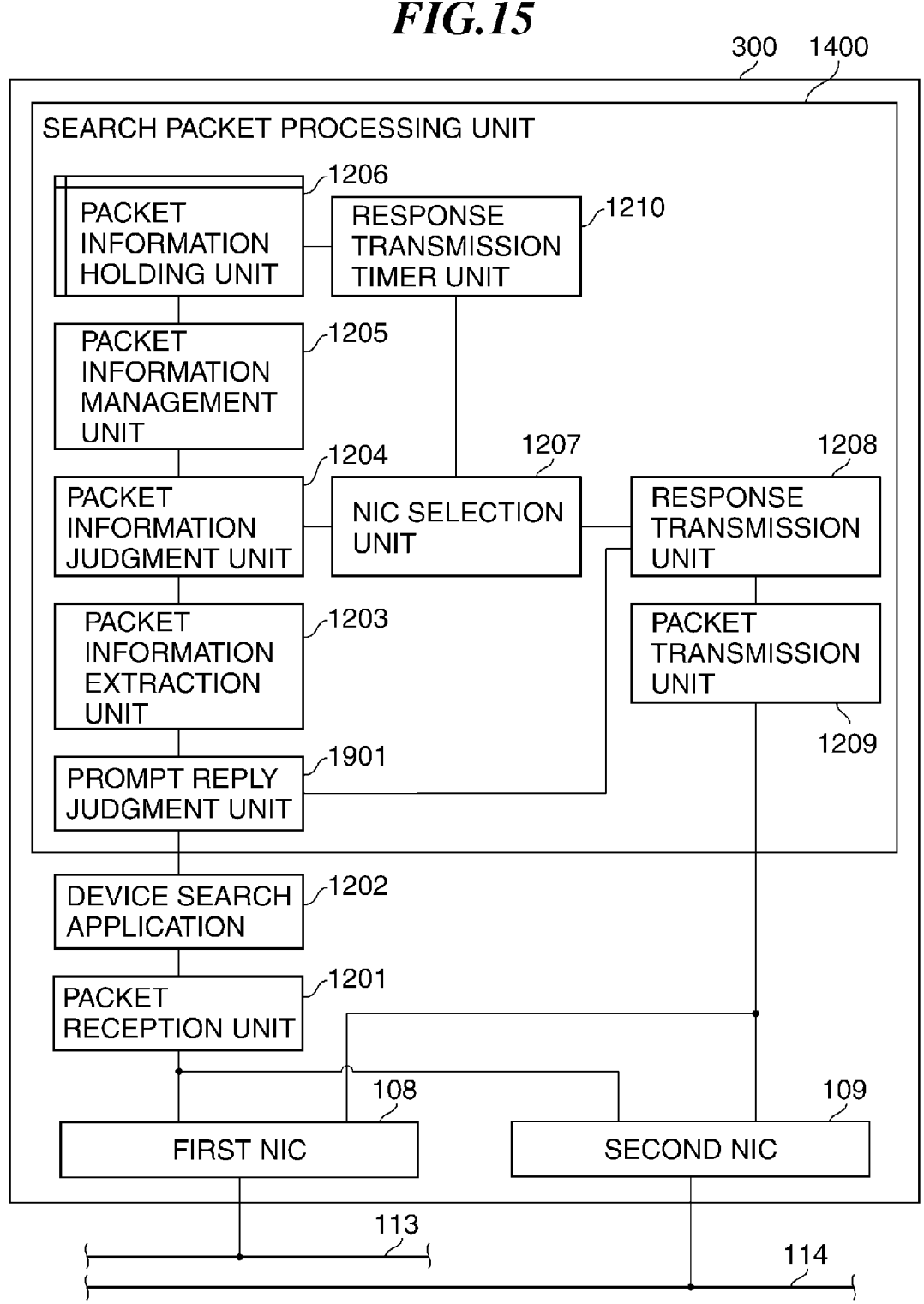
FIG. 15 is a block diagram showing a search process-related software construction of a device according to a third embodiment of this invention.

FIG. 15 shows in block diagram a search process-related software construction of the device 300.

The device 300 only differs from the device 100 shown in FIG. 3 in that a prompt reply judgment unit 1901 is additionally provided between the device search application 1202 and the packet information extraction unit 1203 of a search packet processing unit 1400 (corresponding to the search packet processing unit 1200 in FIG. 3). The prompt reply judgment unit 1901 compares information that represents the receiver NIC with the content of the search packet, and determines whether the receiver NIC is appropriate for sending a reply. If it is determined that the receiver NIC is appropriate for sending a reply, a response message to the search packet is created by the response transmission unit 1208 and transmitted by the packet transmission unit 1209. On the other hand, the prompt reply judgment unit 1901 determines that the receiver NIC is not appropriate for sending a reply, a response packet transmission process is performed by the same procedures as those previously described with reference to FIG. 3.

Figure 16:
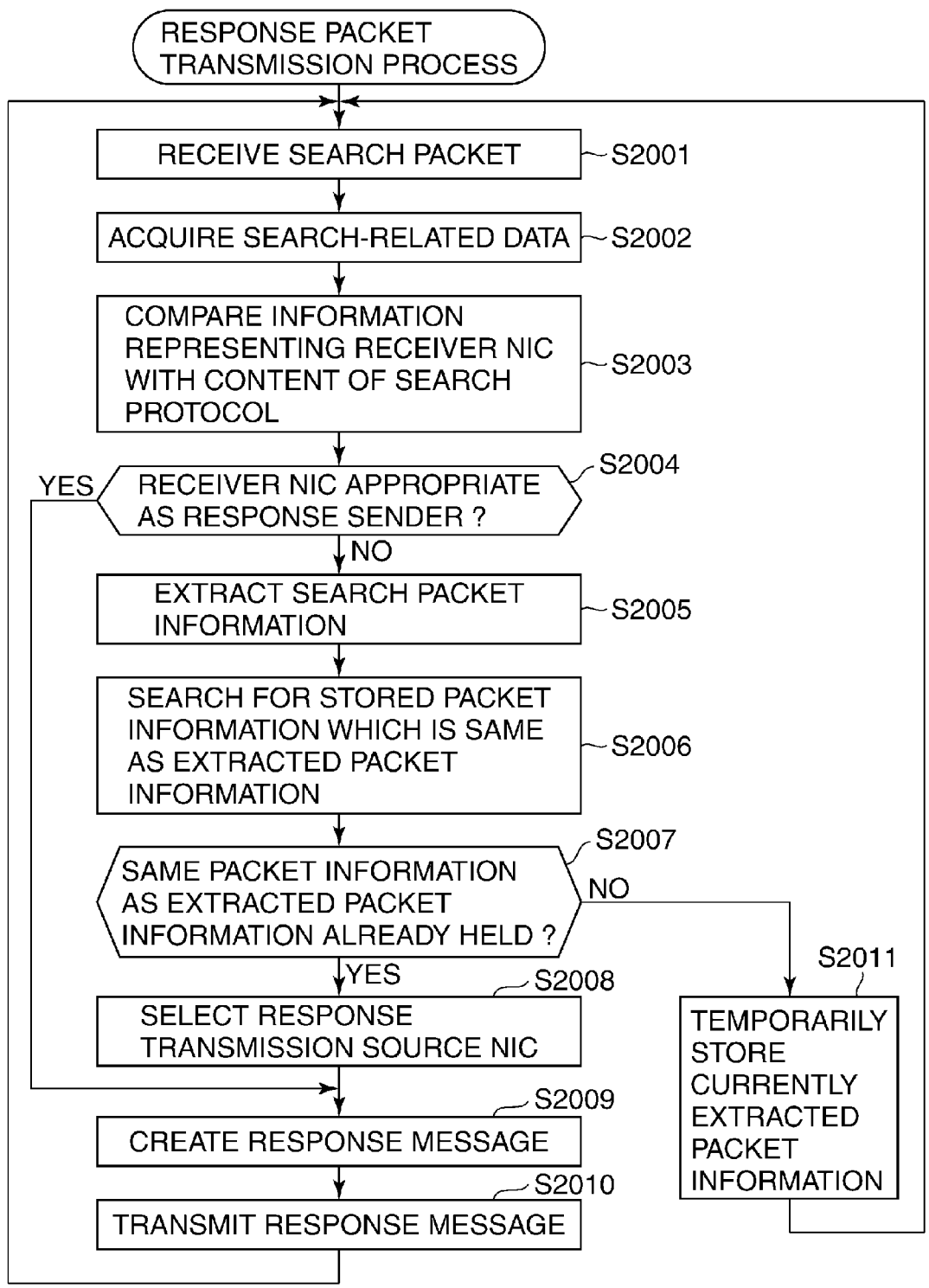
FIG. 16 is a flowchart showing the flow of a process, according to the third embodiment, for transmitting a response packet in reply to a search packet.

FIG. 16 shows in flowchart the flow of a process, according to the third embodiment, for transmitting a response packet in reply to a search packet.

In step S2001, the packet reception unit 1201 receives a search packet from the first NIC 108 or the second NIC 109, and performs low-level protocol processing on an IP header, TCP header, UDP header, etc. In step S2002, the device search application 1202 performs processing on the search packet according to search protocol and acquires search-related data.

In step S2003, the prompt reply judgment unit 1901 compares information representing the NIC that has received the search packet with the content of the search protocol, and determines whether the NIC that has received the search packet can be determined at this stage as being appropriate for sending a response message in reply to the search packet (step S2004). The determination in step S2004 can be made by determining whether the NIC that has received the search packet is capable of immediately sending a response message. For example, it is possible to determine whether the immediate reply can be made based on NIC search protocol and search packet transmission source information (e.g., address), which are set for the NIC that has received the search packet. However, the above are not limitative.

If the answer to step S2004 is YES, the response transmission unit 1208 creates a response message (response packet) according to the search protocol (step S2009). In step S2010, the created response message is transmitted by the packet transmission unit 1209, and the flow returns to step S2001.

On the other hand, if the answer to step S2004 is NO, the packet information extraction unit 1203 analyzes data contained in the received search packet and extracts search packet information from the search packet (step S2005). In step S2006, the packet information management unit 1205 searches for the same packet information as the packet information extracted in step S2005.

In step S2007, the packet information judgment unit 1204 determines whether the same packet information as the packet information extracted in step S2005 is already held in the holding unit 1206. If it is determined in step S2007 that the packet information coincident with the packet information extracted in step S2005 is present in the holding unit 1206, the NIC selection unit 1207 performs the NIC selection process previously described referring to FIG. 12, thereby selecting the response transmission source NIC (step S2008). Then, the flow returns to step S2009.

If it is determined in step S2007 that packet information coincident with the packet information extracted in step S2005 is not present in the holding unit 1206, the packet information management unit 1205 temporarily stores the packet information extracted in S2005 in the holding unit 1206 (step S2011). Then, the flow returns to step S2001.

According to the third embodiment, in a case where a device capable of responding to a search packet receives the same search packet at its plural NICs, the device selects one of the NICs and responds to the search packet. Accordingly, a device on the searching side is able to obtain a single search result, thereby reducing user confusion. Since the response transmission source NIC is selected by taking into account of the purpose of device search, it is possible to send a response more appropriate for the searching device in reply to the search packet.

In the first to third embodiments, cases have been described in which the present invention is applied to image forming apparatuses (devices 100 to 300). However, this invention is not limited to these examples, and also applicable to a communication apparatus and to an information processing apparatus and a terminal each having a communication function.

Although the devices 100 to 300 are each connected to wired networks 113, 114, the present invention can be realized by a construction having a wireless communication function and capable of being connected to a plurality of networks by different wireless communication systems.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-231327, filed Oct. 5, 2009, which is hereby incorporated by reference herein in its entirety.

What is claimed is:

1. A communication apparatus having a plurality of network interfaces, comprising:
   a reception unit configured to receive, via one of the plurality of network interfaces, a search packet for searching a device;
   a first determination unit configured to determine whether information that is same as information indicating the search packet received by said reception unit is stored in a storing unit;
   a selection unit configured to select, among the plurality of network interfaces, a network interface which is to be used to respond to the search packet received by said reception unit;
   a creation unit configured to create a response message to the search packet received by said reception unit;
   a control unit configured to transmit the response message created by said creation unit via the network interface selected by said selection unit when it is determined by said first determination unit that the information is stored in said storing unit, and to store the information indicating the search packet received by said reception unit in said storing unit when it is determined by said first determination unit that the information is not stored in said storing unit; and
   a third determination unit configured to determine a purpose of device search based on a protocol used when said reception unit receives the search packet,
   wherein said selection unit selects the network interface to be used to transmit the response message according to the purpose of device search determined by said third determination unit; and
   wherein said selection unit selects one of the network interfaces which is more local and nearer to a transmission source of the search packet in a case where the purpose of device search determined by said third determination unit is to perform temporary communication, and selects another network interface usable in a wider area in a case where the determined purpose of device search is to perform non-temporary communication.

2. The communication apparatus according to claim 1, further including:
   a second determination unit configured to determine whether a given time period has lapsed from when the information indicating the search packet was stored in said storage unit,
   wherein when it is determined by said second determination unit that the given time period has lapsed, said control unit transmits the response message created by said creation unit via the network interface selected by said selection unit.

3. A communication apparatus having a plurality of network interfaces, comprising:
   a reception unit configured to receive, via one of the plurality of network interfaces, a search packet for searching a device;
   a determination unit configured to determine whether information that is same as information indicating the search packet received by said reception unit is stored in a storing unit;
   a selection unit configured to select, among the plurality of network interfaces, a network interface which is to be used to respond to the search packet received by said reception unit;
   a creation unit configured to create a response message to the search packet received by said reception unit;
   a control unit configured to transmit the response message created by said creation unit via the network interface that is used to receive the search packet, and to store the information indicating the search packet received by said reception unit in said storing unit, when it is determined by said determination unit that the information is not stored in said storing unit; and
   a third determination unit configured to determine a purpose of device search based on a protocol used when said reception unit receives the search packet,
   wherein said selection unit selects the network interface to be used to transmit the response message according to the purpose of device search determined by said third determination unit; and
   wherein said selection unit selects one of the network interfaces which is more local and nearer to a transmission source of the search packet in a case where the purpose of device search determined by said third determination unit is to perform temporary communication, and selects another network interface usable in a wider area in a case where the determined purpose of device search is to perform non-temporary communication.

4. The communication apparatus according to claim 3, further including:
   a discard unit configured to discard the search packet received by said reception unit when it is determined by said determination unit that the information is stored in the storing unit.

5. A communication method for a communication apparatus having a plurality of network interfaces, comprising:
   receiving, via one of the plurality of network interfaces, a search packet for searching a device;
   determining whether information that is same as information indicating the received search packet is stored in a storing unit;
   selecting, among the plurality of network interfaces, a network interface which is to be used to respond to the received search packet;
   creating a response message to the received search packet;
   transmitting the created response message via the selected network interface when it is determined that the information is stored in said storing unit, and storing the information indicating the received search packet in said storing unit when it is determined that the information is not stored in said storing unit; and
   determining a purpose of device search based on a protocol used during said receiving of the search packet,
   wherein said selecting includes selecting the network interface to be used to transmit the response message according to the purpose of device search determined by said determining a purpose of device search; and
   wherein said selecting includes selecting one of the network interfaces which is more local and nearer to a transmission source of the search packet in a case where the purpose of device search determined by said determining a purpose of device search is to perform temporary communication, and selecting another network interface usable in a wider area in a case where the determined purpose of device search is to perform non-temporary communication.

6. A communication method for a communication apparatus having a plurality of network interfaces, comprising:
- receiving, via one of the plurality of network interfaces, a search packet for searching a device;
- determining whether information that is same as information indicating the received search packet is stored in a storing unit;
- selecting, among the plurality of network interfaces, a network interface which is to be used to respond to the received search packet;
- creating a response message to the received search packet;
- transmitting the created response message via the network interface that is used to receive the search packet, and storing the information indicating the received search packet in said storing unit, when it is determined that the information is not stored in said storing unit; and
- determining a purpose of device search based on a protocol used during said receiving of the search packet,
- wherein said selecting includes selecting the network interface to be used to transmit the response message according to the purpose of device search determined by said determining a purpose of device search; and
- wherein said selecting includes selecting one of the network interfaces which is more local and nearer to a transmission source of the search packet in a case where the purpose of device search determined by said determining a purpose of device search is to perform temporary communication, and selecting another network interface usable in a wider area in a case where the determined purpose of device search is to perform non-temporary communication.

7. A non-transitory computer-readable storage medium storing a program for causing a computer to execute a communication method for a communication apparatus having a plurality of network interfaces, the communication method comprising:
- receiving, via one of the plurality of network interfaces, a search packet for searching a device;
- determining whether information that is same as information indicating the received search packet is stored in a storing unit;
- selecting, among the plurality of network interfaces, a network interface which is to be used to respond to the received search packet;
- creating a response message to the received search packet;
- transmitting the created response message via the selected network interface when it is determined that the information is stored in said storing unit, and storing the information indicating the received search packet in said storing unit when it is determined that the information is not stored in said storing unit; and
- determining a purpose of device search based on a protocol used during said receiving of the search packet,
- wherein said selecting includes selecting the network interface to be used to transmit the response message according to the purpose of device search determined by said determining a purpose of device search; and
- wherein said selecting includes selecting one of the network interfaces which is more local and nearer to a transmission source of the search packet in a case where the purpose of device search determined by said determining a purpose of device search is to perform temporary communication, and selecting another network interface usable in a wider area in a case where the determined purpose of device search is to perform non-temporary communication.

8. A non-transitory computer-readable storage medium storing a program for causing a computer to execute a communication method for a communication apparatus having a plurality of network interfaces, comprising:
- receiving, via one of the plurality of network interfaces, a search packet for searching a device;
- determining whether information that is same as information indicating the received search packet is stored in a storing unit;
- selecting, among the plurality of network interfaces, a network interface which is to be used to respond to the received search packet;
- creating a response message to the received search packet;
- transmitting the created response message via the network interface that is used to receive the search packet, and storing the information indicating the received search packet in said storing unit, when it is determined that the information is not stored in said storing unit; and
- determining a purpose of device search based on a protocol used during said receiving of the search packet,
- wherein said selecting includes selecting the network interface to be used to transmit the response message according to the purpose of device search determined by said determining a purpose of device search; and
- wherein said selecting includes selecting one of the network interfaces which is more local and nearer to a transmission source of the search packet in a case where the purpose of device search determined by said determining a purpose of device search is to perform temporary communication, and selecting another network interface usable in a wider area in a case where the determined purpose of device search is to perform non-temporary communication.

* * * * *